(12) United States Patent
Kong et al.

(10) Patent No.: US 7,253,945 B2
(45) Date of Patent: Aug. 7, 2007

(54) AMPLITUDE DIVIDING TYPE LASER AMPLIFICATION APPARATUS

(75) Inventors: Hong Jin Kong, Daejeon (KR); Seong Ku Lee, Daejeon (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 0 days.

(21) Appl. No.: 11/133,556

(22) Filed: May 20, 2005

(65) Prior Publication Data

US 2006/0050366 A1 Mar. 9, 2006

(30) Foreign Application Priority Data

Sep. 8, 2004 (KR) .................. 10-2004-0071785

(51) Int. Cl.
*H01S 4/00* (2006.01)
(52) U.S. Cl. .................. 359/334; 359/300; 359/338
(58) Field of Classification Search ............. 359/334, 359/300, 338
See application file for complete search history.

(56) References Cited

U.S. PATENT DOCUMENTS

| | | | | |
|---|---|---|---|---|
| 4,344,042 A | * | 8/1982 | Hon | 359/338 |
| 5,126,876 A | * | 6/1992 | O'Meara | 359/338 |
| 5,377,211 A | * | 12/1994 | Kong et al. | 372/3 |
| 5,379,147 A | * | 1/1995 | Cook | 359/334 |
| 5,689,363 A | * | 11/1997 | Dane et al. | 359/334 |

FOREIGN PATENT DOCUMENTS

| | | | |
|---|---|---|---|
| KR | 1020000050976 A | | 8/2000 |
| WO | WO00/42465 | * | 7/2000 |

OTHER PUBLICATIONS

Loree, T. R., et al., "Phae Locking two beams by means of seeded Brillouin scattering", Optics Letters, vol. 12, pp. 178-180, (1987).*

* cited by examiner

*Primary Examiner*—Jack Keith
*Assistant Examiner*—Eric Bolda
(74) *Attorney, Agent, or Firm*—Mayer & Williams PC; Stuart H. Mayer, Esq.; Karin L. Williams, Esq.

(57) ABSTRACT

An optical amplification apparatus includes a polarizing beam splitter for reflecting a portion of an incident light and transmitting a remaining portion of the incident light, depending upon a polarized state of the incident light, at least two optical amplification means each including a first polarizing plate which makes polarized states of the light before and after the light reflected from the polarizing beam splitter reciprocatingly passes through the first polarizing plate, to be orthogonal to each other, an amplitude division plate for amplitude-dividing the light having passed through the first polarizing plate, into first and second lights, and optical amplifiers for respectively amplifying the first and second lights which are amplitude-divided by the amplitude division plate. The optical amplification means are located such that the light output from upstream optical amplification means is incident upon the polarizing beam splitter included in downstream optical amplification means.

8 Claims, 6 Drawing Sheets

FIG. 1a

THE BEAM SPLITTER

FIG. 1b

THE BEAM SPLITTER

FIG. 6

AMPLITUDE DIVIDING TYPE LASER AMPLIFICATION APPARATUS

BACKGROUND OF THE INVENTION

1. Field of the Invention

The present invention relates, in general, to an optical amplification apparatus and, more particularly, to an optical amplification apparatus which employs a plurality of optical amplification stages.

2. Description of the Prior Art

In general, a stimulated brillouin scattering-phase conjugate mirror (SBS-PCM) reflects a phase conjugated wave to compensate for the distortion of a laser beam which occurs in a laser amplification procedure. Further, since the SBS-PCM ensures easy arrangement of an optical system, the SBS-PCM is used for a light splitting laser having a high output.

An optical amplification system employing such an SBS-PCM is disclosed in Korean Patent No. 318520.

Hereafter, a conventional optical amplification system will be described with reference to FIG. 1a.

Figure 1A:
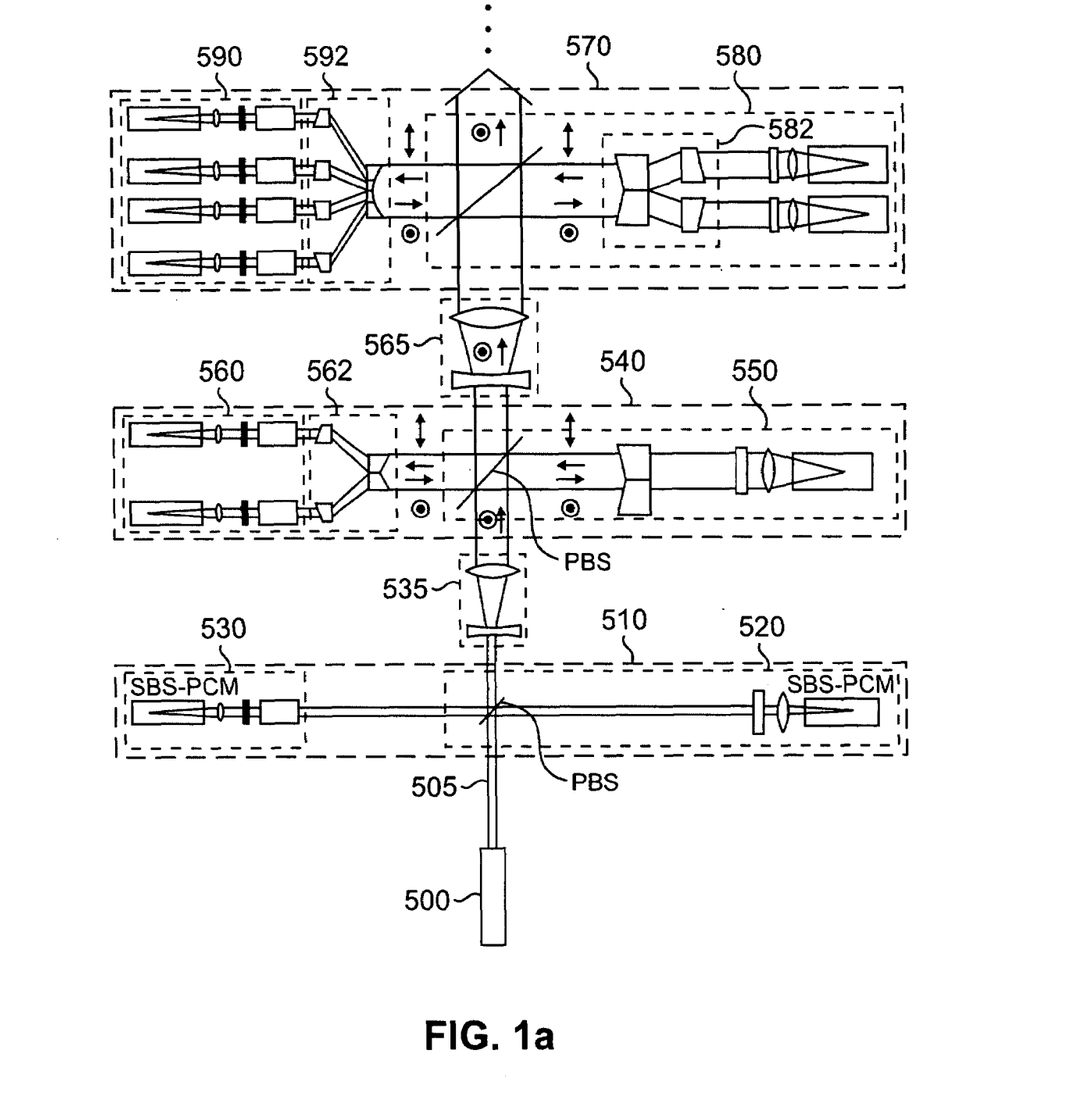
FIG. 1a is a view illustrating a conventional wavefront division type optical amplification apparatus.

FIG. 1a illustrates a conventional optical amplification apparatus.

Referring to FIG. 1a, a light 505, which is output from a laser oscillator 500, is amplified into a gradually increasing number of laser lights while passing through a first optical amplification stage 510, a second optical amplification stage 540, and a third optical amplification stage 570. In detail, the light 505 is reflected by a polarizing beam splitter (PBS), is incident upon a first optical isolator 520, is reflected by an SBS-PCM, is transmitted through the PBS, and is incident upon a first optical amplifier 530. Then, the light which is incident upon the first optical amplifier 530 is amplified while being transmitted through the amplifier, is reflected by an SBS-PCM, and is incident upon the PBS. The light which is incident upon the PBS is reflected and output toward a beam expander (BE) 535. The beam expander 535 enlarges the size of the incident light and outputs the incident light to the second optical amplification stage 540. The second optical amplification stage 540 comprises a second optical isolator 550 which is constructed in the same manner as the first optical isolator 520 of the first optical amplification stage 510 to perform the same function. The second optical amplification stage 540 additionally includes a wavefront division type beam splitter 562 positioned at the front end of a second optical amplifier 560 which forms 2×2 arrays. Here, the wavefront division type beam splitter 562 is used to deliver lights to the respective 2×2 arrays of the second optical amplifier 560. That is to say, before the light is incident upon the second optical amplifier 560, the light is wavefront-divided by the wavefront division type beam splitter 562. These lights are amplified by respective amplifiers arranged along optical axes, are reflected by SBS-PCMs, are re-coupled with each other, and are incident upon a PBS. The PBS reflects and outputs the incident light to a beam expander 565. The beam expander 565 enlarges the size of the incident light and outputs the enlarged incident light to the third optical amplification stage 570. In the third optical amplification stage 570, a third optical amplifier 590 forms 4×4 arrays, and a third optical isolator 580 forms 2×2 arrays. Here, wavefront division type beam splitters 582 and 592 are used to deliver lights to the respective arrays.

Due to the fact that the optical amplification system is constructed in this way, by adding one or more optical amplification stages as desired, output energy can be increased and repeatability can be maintained as it is without causing damage to an optical system. In this regard, when the energy density of a laser light increases due to continuous amplification, if the energy density is not prevented from increasing, damage to the optical system and a laser gain medium is caused. Thus, when it is necessary to enlarge the size of the laser light, the size of the laser gain medium must simultaneously be enlarged. This results in retardation of the cooling velocity of the laser gain medium, and actually makes it impossible to create a laser light having high repeatability. In this consideration, the optical amplification apparatus capable of re-coupling lights shown in FIG. 1a, which can increase the size of the laser light and maintain the size of the gain medium, is used.

Figure 1B:
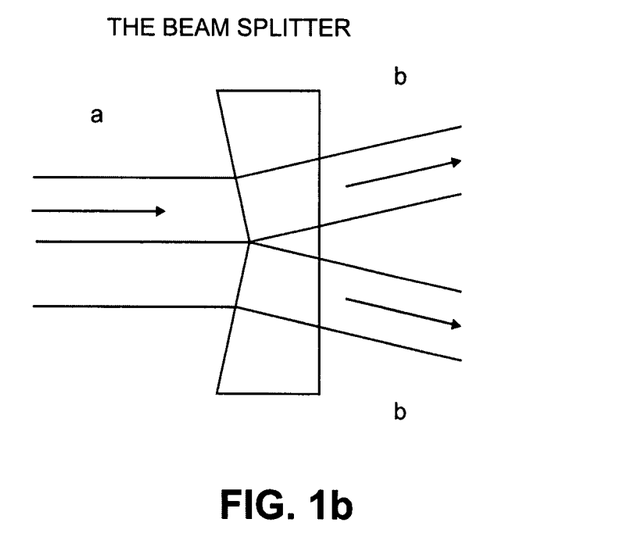
FIGS. 1b and 1c are views comparing a wavefront division type and an amplitude division type.

The beam splitter employed in the optical amplification apparatus capable of re-coupling the lights as shown in FIG. 1a comprises a wavefront division type beam splitter which is shown in FIG. 1b.

Referring to FIG. 1b, the wavefront division type beam splitter divides an incident light 'a' into two output lights 'b'. Namely, in the wavefront division type beam splitter, a laser light is divided into two small-sized laser lights.

Figure 1C:
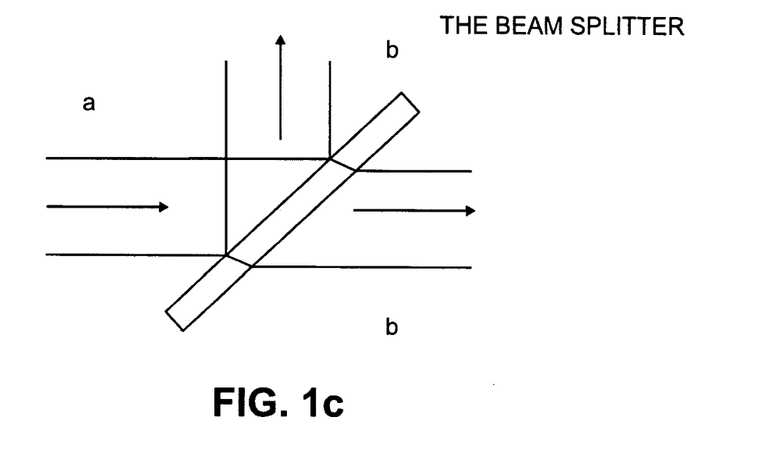

In addition to the wavefront division type beam splitter, an amplitude division type beam splitter has also been disclosed in the art, which is shown in FIG. 1c.

Referring to FIG. 1c, the amplitude division type beam splitter divides an incident light 'a' into two output lights 'b' in a manner such that one output light is transmitted through the beam splitter and the other output light is reflected by the beam splitter. That is to say, in the amplitude division type beam splitter, the size of a laser light is not changed and only energy is shared by the two output lights. In comparison with this amplitude division type, in the wavefront division type which is adopted by the conventional optical amplification apparatus, since the shape of a laser light cannot be the same as that of a light from a main resonator, difficulties are caused in that a cross-section of a gain medium of an amplifier must be formed in the shape of a laser light. The reason for this is that, when a cross-sectional shape of the gain medium is different from the shape of the laser light, amplification efficiency decreases. Further, since a spatial frequency is included in the spatial distribution of a laser light, when reflecting the laser light using an SBS-PCM, breakage of a phase conjugate phenomenon results in. Also, when re-coupling lights after amplification, in the case that phases of two lights at a position where one light meets the other light are different from each other, an intensity spike occurs, which deteriorates the spatial distribution of the lights.

SUMMARY OF THE INVENTION

Accordingly, the present invention has been made keeping in mind the above problems occurring in the prior art, and an object of the present invention is to provide an optical amplification apparatus which adopts an amplitude division type beam splitter to avoid restriction in a type of a gain medium, breakage of a phase conjugate phenomenon, occurrence of an intensity spike upon re-coupling of lights, and so forth, and which employs a beam expander so that, before incidence of a light upon an amplifier, the size of the light can be decreased to the size of the gain medium, and, after optical amplification of the light, the size of the light can be enlarged using the beam expander to reduce a laser energy density, thereby accomplishing high repeatability and a high output without experiencing a limit in energy amplification.

In order to achieve the above object, according to one aspect of the present invention, there is provided an optical amplification apparatus comprising a polarizing beam splitter for reflecting a portion of an incident light and transmitting a remaining portion of the incident light, depending upon a polarized state of the incident light; and at least two optical amplification means each including a first polarizing plate which makes polarized states of the light before and after the light reflected from the polarizing beam splitter reciprocatingly passes through the first polarizing plate, to be orthogonal to each other, an amplitude division plate for amplitude-dividing the light having passed through the first polarizing plate, into first and second lights, and optical amplifiers for respectively amplifying the first and second lights which are amplitude-divided by the amplitude division plate, wherein the at least two optical amplification means are located such that the light outputted from upstream optical amplification means is incident upon the polarizing beam splitter included in downstream optical amplification means.

According to another aspect of the present invention, the first polarizing plate is a quarter wavelength plate.

According to another aspect of the present invention, the amplitude division plate is a polarizing beam splitter.

According to another aspect of the present invention, the polarizing beam splitter divides the light which is incident from the quarter wavelength plate, into laser lights having P-polarized light and S-polarized light.

According to another aspect of the present invention, the optical amplifier includes an optical amplification plate for optical amplification, and Faraday rotators are arranged in front of and behind the optical amplification plate to offset birefringence of the optical amplification plate.

According to another aspect of the present invention, there is provided an optical amplification apparatus including a polarizing beam splitter for reflecting a portion of an incident light and transmitting a remaining portion of the incident light, depending upon a polarized state of the incident light, the apparatus comprising a first polarizing plate which makes polarized states of the light before and after the light reflected from the polarizing beam splitter reciprocatingly passes through the first polarizing plate, to be orthogonal to each other; an amplitude division plate for amplitude-dividing the light having passed through the first polarizing plate, into first and second lights; and optical amplifiers for respectively amplifying the first and second lights which are amplitude-divided by the amplitude division plate.

According to another aspect of the present invention, the first polarizing plate is a quarter wavelength plate.

According to another aspect of the present invention, the amplitude division plate is a polarizing beam splitter.

According to another aspect of the present invention, the polarizing beam splitter divides the light which is incident from the quarter wavelength plate, into laser lights having P-polarized light and S-polarized light.

According to another aspect of the present invention, the optical amplifier includes an optical amplification plate for optical amplification, and Faraday rotators are arranged in front of and behind the optical amplification plate to offset birefringence of the optical amplification plate.

According to another aspect of the present invention, there is provided an optical amplification apparatus comprising a polarizing beam splitter for reflecting a portion of an incident light and transmitting a remaining portion of the incident light, depending upon a polarized state of the incident light; an optical isolator including a first polarizing plate which makes polarized states of the light before and after the light reflected from the polarizing beam splitter reciprocatingly passes through the first polarizing plate, to be orthogonal to each other, and a stimulated brillouin scattering-phase conjugate mirror for reflecting the light having passed through the first polarizing plate; and at least two optical amplification means each including a second polarizing plate which makes polarized states of the light before and after the light transmitted through the polarizing beam splitter by the first polarizing plate reciprocatingly passes through the second polarizing plate, to be orthogonal to each other, an amplitude division plate for amplitude-dividing the light having passed through the second polarizing plate, into first and second lights, and optical amplifiers including stimulated brillouin scattering-phase conjugate mirrors for respectively amplifying and reflecting the first and second lights which are amplitude-divided by the amplitude division plate, wherein the at least two optical amplification means are arranged in the shape of a chain such that the light outputted from upstream optical amplification means is incident upon the polarizing beam splitter included in downstream optical amplification means.

According to another aspect of the present invention, the optical amplification means further includes a pre-pulser located in front of the stimulated brillouin scattering-phase conjugate mirror, for preventing a front end of a main pulse which is incident upon the stimulated brillouin scattering-phase conjugate mirror, from being cut.

According to another aspect of the present invention, the first polarizing plate is a quarter wavelength plate.

According to another aspect of the present invention, the amplitude division plate is a polarizing beam splitter.

According to another aspect of the present invention, the polarizing beam splitter divides the light which is incident from the quarter wavelength plate, into laser lights having P-polarized light and S-polarized light.

According to still another aspect of the present invention, the optical amplifier includes an optical amplification plate for optical amplification, and Faraday rotators are arranged in front of and behind the optical amplification plate to offset birefringence of the optical amplification plate.

According to yet another aspect of the present invention, the optical amplifier includes a phase locker for fixing a phase of a reflected wave to the stimulated brillouin scattering-phase conjugate mirror.

According to yet still another aspect of the present invention, the optical amplifier includes a sonic wave generator attached to the stimulated brillouin scattering-phase conjugate mirror and controls the phase of the reflected wave based on a generated sonic wave.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
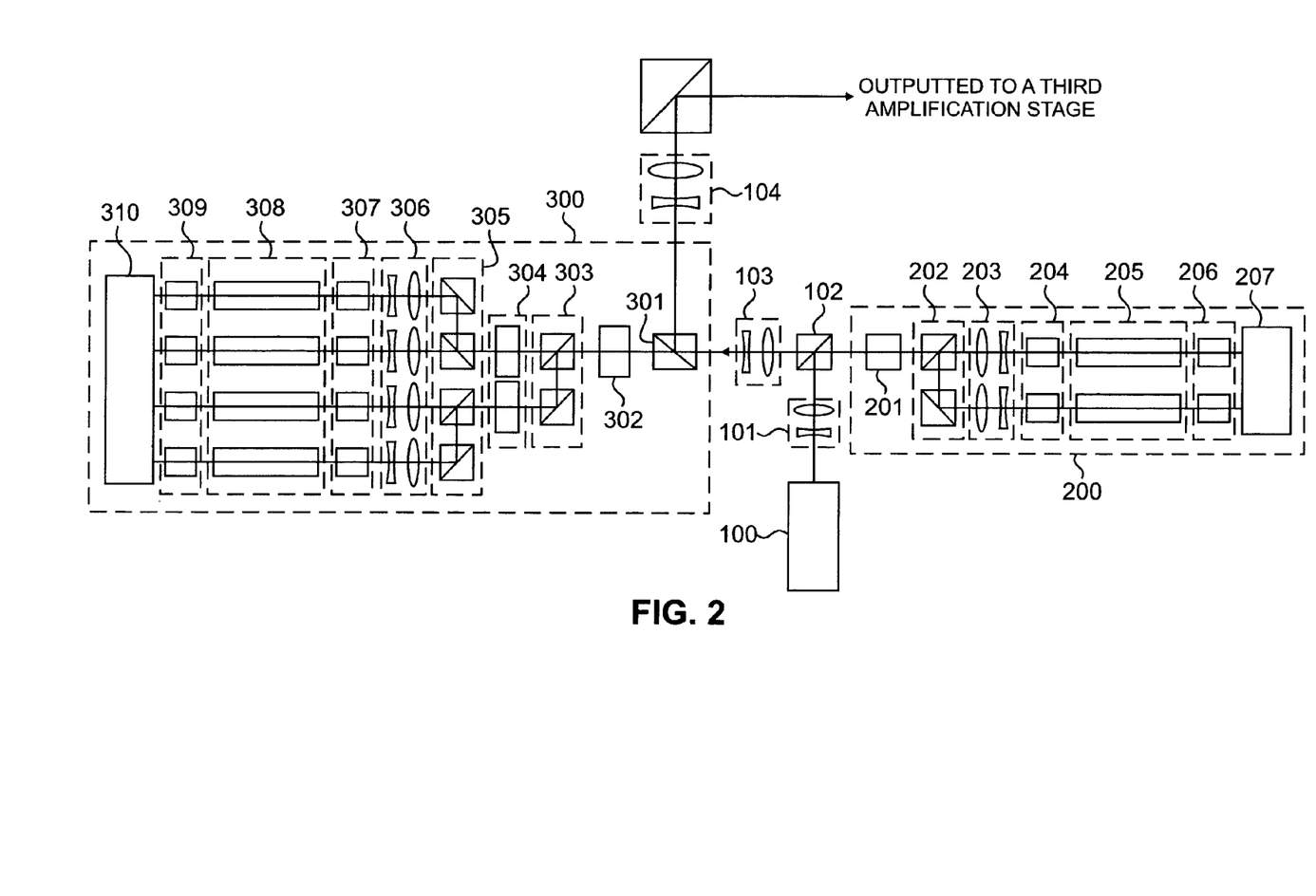
FIG. 2 is a view illustrating an optical amplification apparatus having a plurality of optical amplification stages in accordance with an embodiment of the present invention.

FIG. 2 is a view illustrating an optical amplification apparatus having a plurality of optical amplification stages in accordance with an embodiment of the present invention.

Referring to FIG. 2, the optical amplification apparatus comprises a laser oscillator 100 for generating a laser light, a beam expander (BE) 101 for enlarging a size of the laser light, a polarizing beam splitter (PBS) 102 for reflecting the enlarged light, a first optical amplification stage 200 for amplifying the reflected light, a BE 103 for enlarging a size of the light amplified by the first optical amplification stage 200, a second optical amplification stage 300 for amplifying once more the light amplified by the first optical amplification stage 200, and a BE 104 for enlarging a size of the light amplified by the second optical amplification stage 300. The light amplified by the second optical amplification stage 300 is output to a third amplification stage (not shown).

In the first optical amplification stage 200, devices for amplification of the light, such as a quarter wavelength plate 201, PBSs 202, BEs 203, Faraday rotators (FRs) 204, amplifiers 205, FRs 206, and a phase locker (PL) 207 are located along an optical path. Also, in the second optical amplification stage 300, devices for amplification of the light, such as a PBS 301, a quarter wavelength plate 302, PBSs 303, 45° rotators 304, PBSs 305, BEs 306, FRs 307, amplifiers 308, FRs 309, and a PL 310 are located along an optical path.

The laser light from the laser oscillator 100 which has S-polarization is enlarged in size by the BE 101 and is reflected by the PBS 102 to be incident upon the first optical amplification stage 200. The light which is incident upon the first optical amplification stage 200 becomes a circularly polarized light after passing through the quarter wavelength plate 201, and then, is amplitude-divided by the PBS 202 so that a portion (a P-polarized light) of the light is reflected by the PBS 202 and a remaining portion (an S-polarized light) of the light is transmitted through the PBS 202. The P-polarized laser light and the S-polarized laser light are amplified while passing through optical paths including the BEs 203, the FRs 204, the amplifiers 205, the FRs 206 and the PL 207. Then, each of the laser lights is transmitted through or is reflected by the PBS 202 in the same polarized state. The laser lights are re-coupled with each other in front of the quarter wavelength plate 201 to be turned back into a circularly polarized light before division is implemented. The re-coupled light is transmitted through the quarter wavelength plate 201 to become a P-polarized laser light. The laser light amplified in this way is transmitted through the PBS 102 and is enlarged in size by the BE 103.

The light enlarged by the BE 103 is incident upon the second optical amplification stage 300. In the second optical amplification stage 300, the light is amplitude-divided into four lights, and the four lights are re-coupled to be incident upon the third amplification stage (not shown). The PBS 301 of the second optical amplification stage 300 outputs the incident light to the quarter wavelength plate 302. The PBS 303 amplitude-divides the light from the quarter wavelength plate 302, so that P-polarized laser lights are transmitted through the PBS 303 and the S-polarized laser lights are reflected by the PBS 303 to be respectively outputted to the 45° rotators 304. At this time, in order to amplitude-divide one light into two lights, a combination of one 45° rotator 304 and two PBSs 305 is used to constitute 2×2 arrays. When the P-polarized light and S-polatized light are transmitted through the 45° rotators 304, their polarized states are rotated by 45°. As a consequence, these polarized lights are amplitude-divided into two lights by the PBSs 305 being the next optical devices. Since the subsequent procedure performs the same function for the same construction as the first optical amplification stage 200, detailed description thereof will be omitted herein. When the polarized lights reciprocate through the 45° rotators 304, because the polarized lights are rotated by +45° and −45°, the polarized states are not changed. Therefore, since the amplitude division using the 45° rotators and the PBSs can be infinitely implemented, by arranging one or more additional amplification stages after the second optical amplification stage 300, unlimited amplification of energy is possible.

Figure 3:
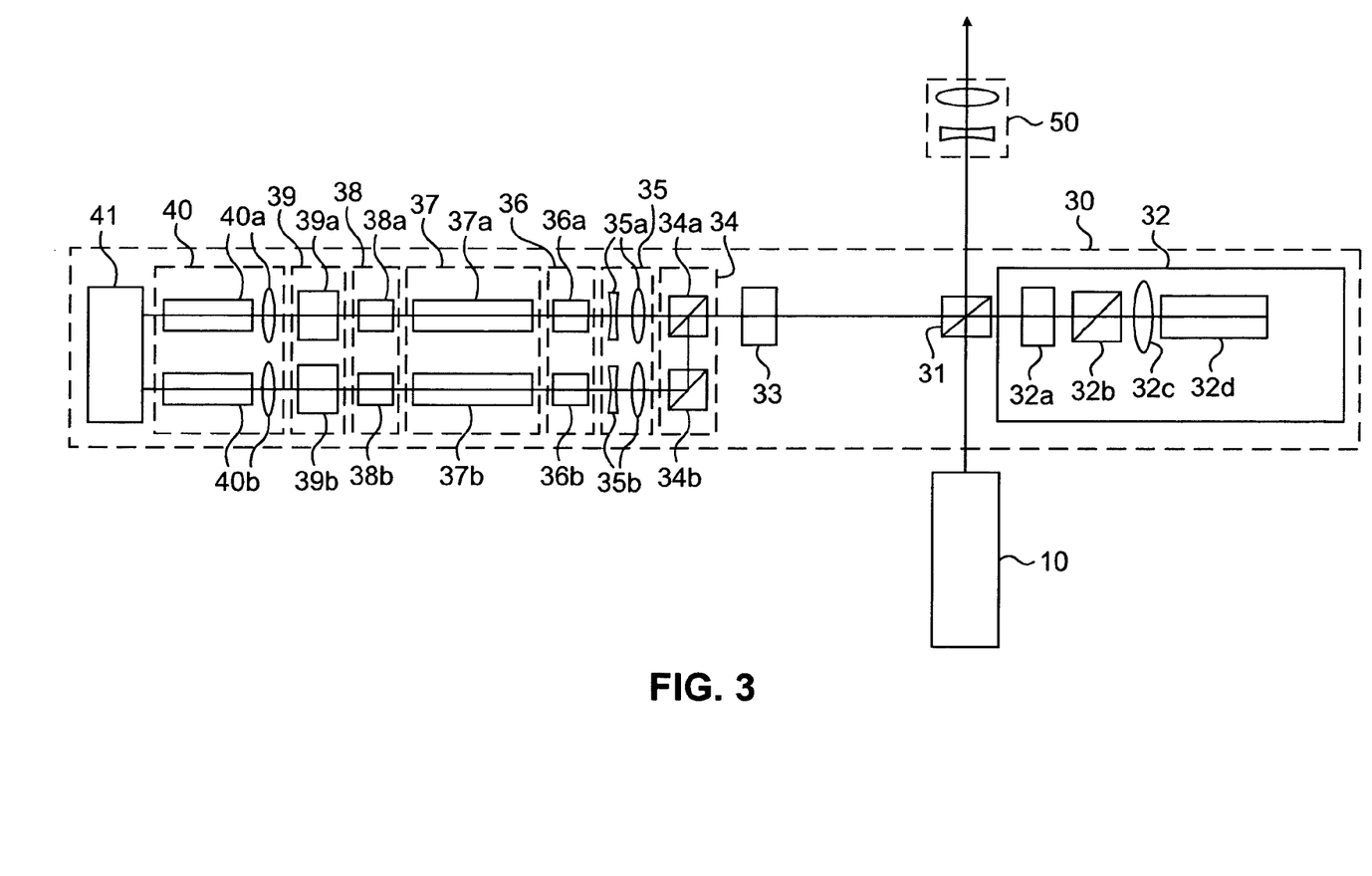
FIG. 3 is a view illustrating an amplitude division type optical amplification stage in accordance with another embodiment of the present invention.

FIG. 3 is a view illustrating an amplitude division type optical amplification stage in accordance with another embodiment of the present invention.

FIG. 3 represents an example in which an SBS-PCM is applied to an amplitude division type optical amplification stage.

Referring to FIG. 3, there are illustrated a laser oscillator 10 for generating a laser light, a first optical amplification stage 30 for amplifying the laser light outputted from the laser oscillator 10, and a beam expander 50 for enlarging a size of the light amplified by the first optical amplification stage 30. The first optical amplification stage 30 defines a cross-shaped configuration which is centered on a PBS 31 upon which the laser light from the laser oscillator 10 is incident. An optical isolator 32 is positioned at one side of the PBS 31, and, at an opposite side of the PBS 31, devices for amplification of the light, such as a quarter wavelength plate 33, a PBS 34, a BE 35, an FR 36, an amplifier 37, an FR 38, a pre-pulser 39, an SBS-PCM 40 and a PL 41 are located along an optical path.

An S-polarized laser light from the laser oscillator 10 is reflected by the PBS 31 to be incident upon the first optical isolator 32. In the first optical isolator 32, the S-polarized laser light is transmitted through a quarter wavelength plate 32a and a pre-pulser 32b and is reflected by an SBS-PCM 32d. A lens 32c is used to focus light on the SBS-PCM 32d. Hereafter, the lens 32c will be explained as it is integrated with the SBS-PCM. The light reflected by the SBS-PCM 32d is reversely transmitted through the pre-pulser 32b and the quarter wavelength plate 32a and then is transmitted through the PBS 31 as the P-polarized laser light. The P-polarized laser light becomes a circularly polarized light after being transmitted through a quarter wavelength plate 33 and is amplitude-divided by a PBS 34a. That is to say, the PBS 34a transmits a P-polarized laser light which is a portion of the circularly polarized laser light and reflects an S-polarized laser light which is a remaining portion of the circularly polarized laser light.

Thereafter, the P-polarized laser light is transmitted through a BE 35a, is decreased in size to correspond to a size of a gain medium, and is then incident upon an FR 36a. The light transmitted through the FR 36a is incident upon an amplifier 37a to be amplified, and the amplified light is incident upon an FR 38a. The light transmitted through the FR 38a is reflected by an SBS-PCM 40a after passing through a pre-pulser 39a, an SBS-PCM 40a and the PL 41 and then again passes through the FR 36a. At this time, since the FRs 36a and 38a which are located in front of and behind the amplifier 37 permit a difference of 90° between an incident polarization surface and a reflected polarization surface, the FRs 36a and 38a function to offset birefringence produced in the amplifier 37. The pre-pulser 39a which is located in front of the SBS-PCM 40a will be described later with reference to FIG. 5.

The light reflected by the SBS-PCM 40a is transmitted in an order which is reverse to that of the incidence procedure, that is, through the pre-pulser (PP) 39a, the FR 38a, the amplifier 37a, the FR 36a and the BE 35a, and is returned to the PBS 34 as an amplified P-polarized laser light.

Meanwhile, the S-polarized laser light is amplified through the same optical path as is the P-polarized laser light, that is, while passing through a BE 35b, an FR 36b, an amplifier 37b, an FR 38b, a PP 39b and an SBS-PCM 40b. The light reflected by the SBS-PCM 40b is transmitted in reverse order to that of the incidence procedure, that is, through the PP 39b, the FR 38b, the amplifier 37b, the FR 36b and the BE 35b, and is reflected by the PBS 34b to serve as an amplified S-polarized laser light. As a result, the P-polarized laser light is transmitted through the PBS 34a and the S-polarized laser light is reflected by the PBS 34a so that they are re-coupled with each other in front of the quarter wavelength plate 33. Here, since the re-coupled laser light is a circularly polarized light which is the same as before division, the re-coupled light is transmitted through the quarter wavelength plate 33 and becomes an S-polarized laser beam. Accordingly, the re-coupled laser light is reflected by the PBS 31, and, then, after being enlarged in size by the first beam expander 50, is output.

An optical amplification apparatus having a plurality of such optical amplification means will be described with reference to FIG. 4.

Figure 4:
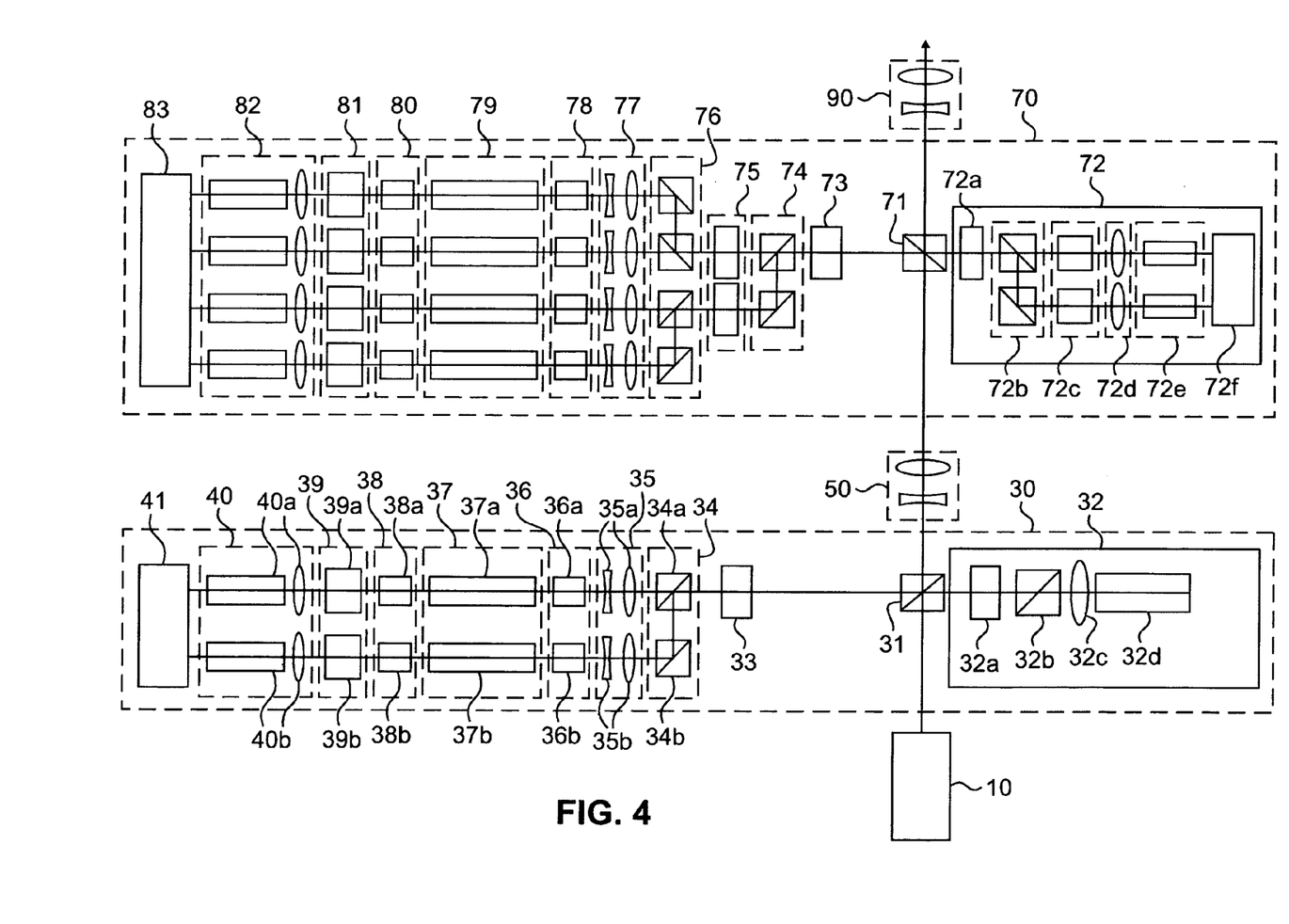
FIG. 4 is a view illustrating an optical amplification apparatus having a plurality of optical amplification stages, one of which is shown in FIG. 3.

FIG. 4 is a view illustrating an optical amplification apparatus having a plurality of optical amplification stages.

Referring to FIG. 4, the optical amplification apparatus comprises a laser oscillator 10 for generating a laser light and a first optical amplification stage 30 for amplifying the light from the laser oscillator 10. The light amplified by the first optical amplification stage 30 is enlarged in size by a first beam expander 50, and is then incident upon a second optical amplification stage 70 to be amplified. Thereupon, as the light passes through a second beam expander 90, the light is enlarged in size. The first optical amplification stage 30 amplitude-divides the light into two lights. Then, after being amplified, the two lights are re-coupled to be incident upon the second optical amplification stage 70. The second optical amplification stage 70 amplitude-divides the light into four lights. Then, after being amplified, the four lights are re-coupled to be incident upon the next optical amplification stage (not shown). Here, since the first optical amplification stage 30 was described in detail with reference to FIG. 3 and the same reference numerals will be used to refer to the same parts, further detailed description thereof will be omitted herein.

Hereafter, the second optical amplification stage 70 to which the light amplified in the first optical amplification stage 30 is incident to be amplified will be described. In the second optical amplification stage 70, the same parts as those of the first optical amplification stage 30 are assumed to perform the same functions.

The second optical amplification stage 70 shown in FIG. 4 is centered on a PBS 71 upon which the laser light from the first beam expander 50 is incident. A second optical isolator 72 is positioned at one side of the PBS 71, and, at the other side of the PBS 71 which is opposite the second optical isolator 72, devices for amplification of the light, such as a quarter wavelength plate 73, two PBSs 74, two 45° rotators 75, four PBSs 76, four BEs 77, four FRs 78, four amplifiers 79, four FRs 80, four pre-pulsers 81, four SBS-PCMs 82 and four PLs 83 are located along an optical path. In the second beam isolator 72, the light reflected on the PBS 71 is amplitude-divided while passing through a quarter wavelength plate 72a and a PCM 72b, is reflected on an SBS-PCM 72e after passing through an optical path, and is returned to the PBS 71. The PBS 71 outputs the light, which is incident from the second optical isolator 72, to the quarter wavelength plate 73. The PBS 74 amplitude-divides the light from the quarter wavelength plate 73 so that a P-polarized light is transmitted through the PBS 74 and an S-polarized light is reflected on the PBS 74 to be outputted to the 45° rotator 75. At this time, in order to amplitude-divide one light into two lights, a combination of one 45° rotator 75 and two PBSs 76 is used to constitute 2×2 arrays. When the P-polarized light and S-polarized light are transmitted through the 45° rotators 75, their polarized states are rotated by 45°. As a consequence, these polarized lights are amplitude-divided into two lights by the PBSs 76 being the next optical devices. Since the subsequent procedure is constructed in the same manner as in the case of FIG. 3, the same functionality is accomplished. When the polarized lights reciprocate through the 45° rotators 75, because the polarized lights are rotated by +45° and −45°, the polarized states are not changed. Therefore, since the amplitude division using the 45° rotators and the PBSs can be infinitely implemented, by arranging one or more additional amplification stages after the second optical amplification stage 70, unlimited amplification of energy is possible.

Hereinafter, the pre-pulser which is employed in the optical amplification apparatus will be described in further detail.

Figure 5:
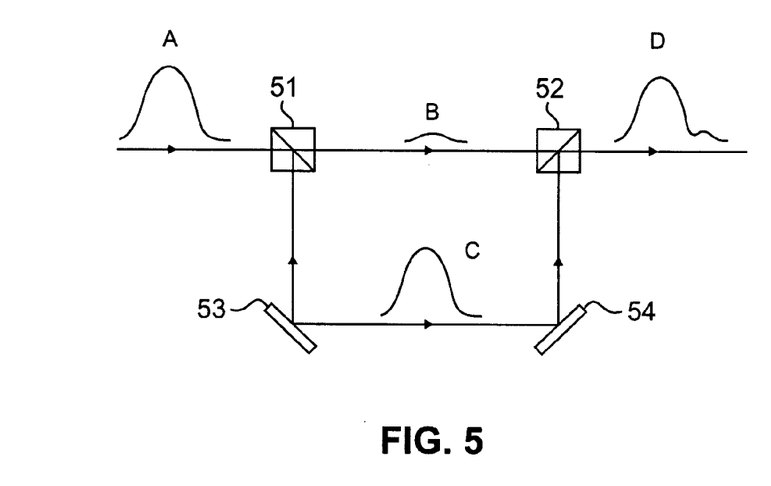
FIG. 5 is a view illustrating a pre-pulser shown in FIG. 4.

FIG. 5 is a view illustrating the pre-pulsers shown in FIG. 4.

Referring to FIG. 5, the pre-pulser is located in front of the SBS-PCM in the above-described optical amplification apparatus to ensure that, before a main pulse 'C' having large energy is incident upon the SBS-PCM, a pre-pulse 'B' having small energy is incident to produce in advance a sonic wave and to thereby prevent the front end of the main pulse 'C' from being cut. In the case of the laser pulse which is incident upon the SBS-PCM, since damage to the front end of a pulse is caused for the sake of transmission or generation of a sonic wave, when the laser pulse is reflected, the front end of the laser pulse is cut to have an abruptly rising shape. When this reflected wave is incident upon the next SBS-PCM, it causes optical breakdown or deteriorates phase conjugation fidelity. Therefore, the pre-pulsers are located to prevent the front end of the reflected wave from being cut due to reflection by the continuous SBS-PCMs. In the embodiment shown in FIG. 5, as a pre-pulse for preventing pulse-shaped deformation of the reflected wave, an amplitude of a laser beam is divided using the PBSs 51 and 52 or beam splitters, and a time difference between the main pulse 'C' and the pre-pulse 'B' is determined by adjusting an optical path. Thus, the final pulse produced by the main pulse 'C' and the pre-pulse 'B' has the shape designated by the reference character 'D'.

Further, in the SBS-PCMs employed in the above-described optical amplification apparatus, the PLs are simultaneously located to fix the phases of the reflected waves which are reflected on the respective SBS-PCMs.

Figure 6:
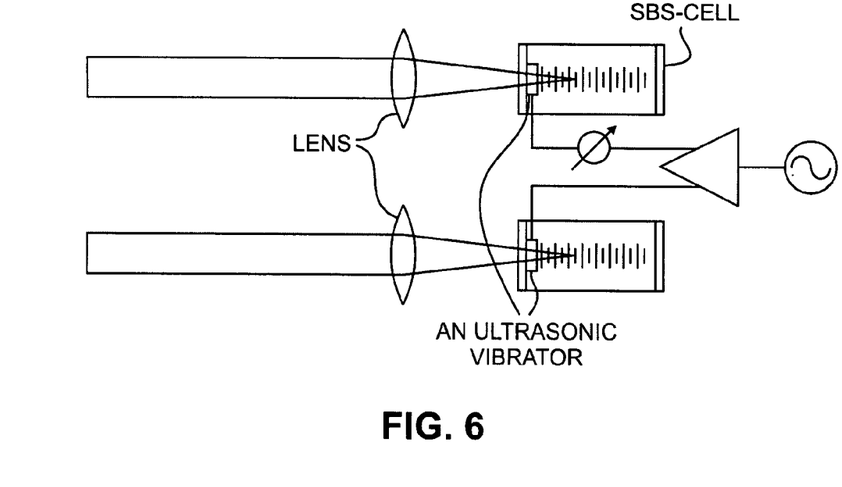
FIG. 6 is a view illustrating another example of phase control by the SBS-PCM shown in FIG. 4.

FIG. 6 is a view illustrating another example of phase control by the SBS-PCM shown in FIG. 4.

Referring to FIG. 6, there is illustrated a method in which a sonic wave is directly generated externally of the SBS-PCM to enable phase control. An ultrasonic vibrator is attached to the SBS-PCM (SBS-cell) and is externally vibrated to generate a sonic wave in the SBS-PCM to thereby control the phase of a reflected wave. In other words, the stimulated brillouin scattering (SBS) is induced from sonic wave noise. When scattering is provoked, the phase of the reflected wave is random. Accordingly, the sonic wave functions to control this random state. Therefore, by causing a sonic wave having a frequency which corresponds to that of a stimulated brillouin scattering medium or to that of a harmonic wave, to be directly incident upon the stimulated brillouin scattering medium, the phase of the reflected wave is controlled. If the phase of an initially generated sonic wave is controlled, the phase of a subsequently generated sonic wave can be controlled, as a result of which the phase of the reflected wave can be controlled. As a consequence, before a laser beam is incident to control the phase of the initially generated sonic wave, a sonic wave is generated in advance in the stimulated brillouin scattering medium. Consequently, the subsequently provoked stimulated brillouin scattering starts from the already generated sonic wave, and as a result of this, the phases of the sonic wave and the reflected wave are controlled. In particular, by allowing the sonic wave to be generated at an exact time, it is possible to control the phase irrespective of incident energy. In order to generate the sonic wave, in addition to the ultrasonic vibrator, an acousto-optic modulator (AOM) can be employed.

As apparent from the above description, the optical amplification apparatus for amplifying a laser light according to the present invention provides advantages in that it realizes high repeatability and a high output.

Further, since the optical amplification apparatus according to the present invention adopts an amplitude division method, all disadvantages of a wavefront division method are overcome, and limitless energy amplification is possible.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optical amplification apparatus comprising:
a polarizing beam splitter for reflecting a portion of an incident light and transmitting a remaining portion of the incident light, depending upon a polarized state of the incident light;
an optical isolator receiving light from and transmitting light to the polarizing beam splitter, said optical isolator including a first polarizing plate for changing polarization states of the light traversing therethrough, and a stimulated brillouin scattering-phase conjugate mirror for reflecting the light that has passed through the first polarizing plate; and
at least two optical amplification means that includes an upstream optical amplification means and a downstream amplification means, each of the optical amplification means including a second polarizing plate for changing polarization states of the light traversing therethrough, an amplitude division plate for amplitude-dividing the light having passed through the second polarizing plate, into first and second lights, and optical amplifiers including stimulated brillouin scattering-phase conjugate mirrors for respectively amplifying and reflecting the first and second lights which are amplitude-divided by the amplitude division plate, wherein the at least two optical amplification means are arranged in the shape of a chain such that the light outputted from the upstream optical amplification means is incident upon the polarizing beam splitter included in the downstream optical amplification means.

2. The optical amplification apparatus according to claim 1, wherein the optical amplification means further includes a pre-pulser located in front of the stimulated brillouin scattering-phase conjugate mirror, for preventing a front end of a main pulse which is incident upon the stimulated brillouin scattering-phase conjugate mirror, from being cut.

3. The optical amplification apparatus according to claim 2, wherein the first and second polarizing plate is a quarter wavelength plate.

4. The optical amplification apparatus according to claim 3, wherein the amplitude division plate is a polarizing beam splitter.

5. The optical amplification apparatus according to claim 4, wherein the polarizing beam splitter divides the light which is incident from the quarter wavelength plate, into laser lights having P-polarized light and S-polarized light.

6. The optical amplification apparatus according to claim 5, wherein the optical amplifier includes an optical amplification plate for optical amplification, and Faraday rotators are arranged in front of and behind the optical amplification plate to offset birefringence of the optical amplification plate.

7. The optical amplification apparatus according to claim 6, wherein the optical amplifier includes a phase locker for fixing a phase of a reflected wave to the stimulated brillouin scattering-phase conjugate mirror.

8. The optical amplification apparatus according to claim 1, wherein the optical amplifier includes a sonic wave generator attached to the stimulated brillouin scattering-phase conjugate mirror and controls the phase of the reflected wave based on a generated some wave.

* * * * *